(12) United States Patent
Kazuo

(10) Patent No.: US 11,106,002 B2
(45) Date of Patent: Aug. 31, 2021

(54) LENS DRIVING DEVICE

(71) Applicant: AAC Optics Solutions Pte. Ltd., Singapore (SG)

(72) Inventor: Shikama Kazuo, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 117 days.

(21) Appl. No.: 16/729,465

(22) Filed: Dec. 29, 2019

(65) Prior Publication Data

US 2020/0241235 A1  Jul. 30, 2020

(30) Foreign Application Priority Data

Jan. 30, 2019  (JP) .............................. JP2019-013939

(51) Int. Cl.
*G02B 7/02* (2021.01)
*G02B 7/04* (2021.01)
*G03B 13/34* (2021.01)

(52) U.S. Cl.
CPC ............... *G02B 7/04* (2013.01); *G03B 13/34* (2013.01)

(58) Field of Classification Search
CPC ........ G02B 7/04; G02B 7/022; G02B 27/646; G03B 13/34; G03B 3/10; G03B 5/00; G03B 2205/0007; G03B 2205/0069; G03B 30/00; H02K 41/031; H04N 5/23287
USPC ................................................ 359/823–829
See application file for complete search history.

(56) References Cited

U.S. PATENT DOCUMENTS 10,503,050 B2 * 12/2019 Minamisawa ....... G02B 27/646

* cited by examiner

*Primary Examiner* — James C. Jones
(74) *Attorney, Agent, or Firm* — W&G Law Group LLP

(57) ABSTRACT

The present disclosure provides a lens driving device which is small and has good focus adjustment and hand shake correction. The lens driving device includes: a case; a lens module; a support frame; a spring leaf; a support part connecting the support frame with the fixing base in such a manner that the support frame is freely movable relative to the fixing base in a direction orthogonal to an optical axis of a lens; a magnet steel; a first driving coil; and a second driving coil. Under an electromagnetic interaction between the second driving coil and a second portion of the magnet steel opposite to the second driving coil, the support frame moves relative to the fixing base in the direction orthogonal to the optical axis of the lens.

14 Claims, 2 Drawing Sheets

LENS DRIVING DEVICE

TECHNICAL FIELD

The present disclosure relates to the technical field of driving devices, and in particular, to a lens driving device having an anti-shake function.

BACKGROUND

With rapid development of photography technologies, lens driving devices have been widely used in a large number of photographic devices. Application of the lens driving device in various portable electronic devices, such as mobile phones, tablet computers, etc., has been especially accepted by consumers.

A driving mechanism of a lens driving device suitable for a general portable electronic device is generally formed by a coil and a permanent magnet, and the coil is fixed to an outer circumference of a camera lens frame. When a current is applied to the coil, the coil drives the camera lens frame to move in an optical axis direction of the lens under an electromagnetic force, thereby achieving focusing. However, when a user holds an electronic device for photographing, it inevitably causes shake of the lens driving device due to hand shake. Therefore, the lens sometimes moves continuously in a direction orthogonal to an optical axis of the lens. Thus, in the lens driving device, an influence caused by the hand shake cannot be avoided, resulting in a deterioration in the quality of a captured image.

Further, in a conventional device for correcting hand shake, it is necessary to use a driving circuit disposed at a bottom portion to drive a center of gravity of a lens module located at a higher position facing away from the driving circuit. In order to correct shake in the direction orthogonal to the optical axis, it may require a bigger force.

Therefore, it is needed to provide a new lens driving device that can solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
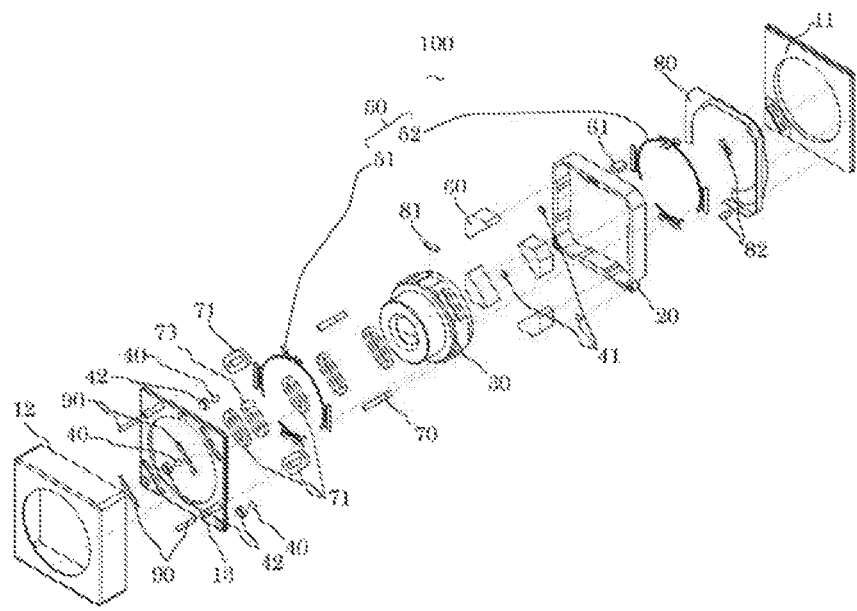
FIG. 1 is an exploded perspective view of a lens driving device according to the present disclosure.
Figure 2:
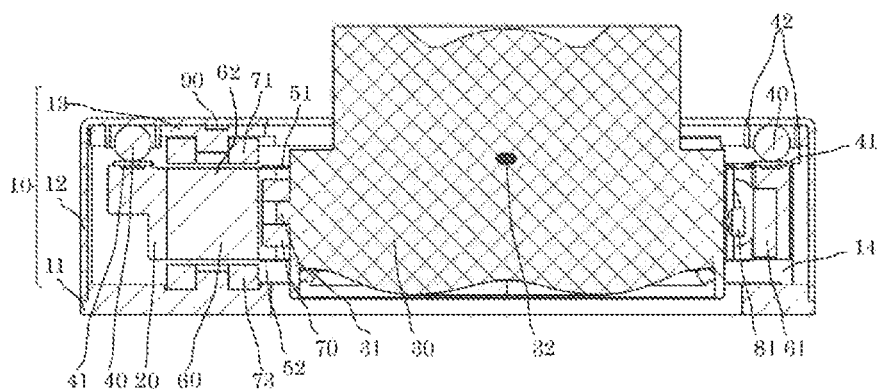
FIG. 2 is a cross-sectional view of a lens driving device according to the present disclosure.
Figure 3:
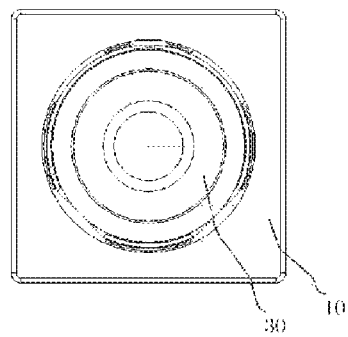
FIG. 3 is a front view of a lens driving device according to the present disclosure.
Figure 4:
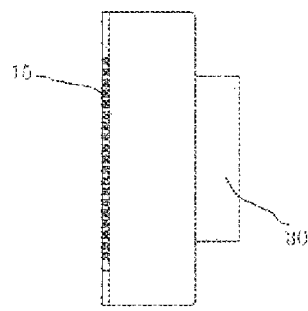
FIG. 4 is a left side view of a lens driving device according to the present disclosure.

Hereinafter, the present disclosure will be described in detail with reference to the accompanying drawings.

FIGS. 1 to 4 are diagrams showing a lens driving device 100 according to the present disclosure.

The lens driving device 100 includes: a case 10, a lens module 30, a support frame 20, a spring leaf 50, a support part 40, a magnet steel 60, a first driving coil 70 and a second driving coil 71.

The case 10 includes a receiving space 14, and the case 10 includes: a fixing base 13; a cover 12 for forming the receiving space 14 together with the fixing base 13, and a connection line fixing base 11 for fixing a connection line 80. For example, the cover 12 can be made of a metal material, and thus has great strength and high drop reliability.

The fixing base 13 includes a cylindrical holding member 42 and a second driving coil 71 fixed to the fixing base 13.

The support frame 20 is received in the receiving space 14 of the case 10, the lens module 30 is received in the support frame 20, and the lens module 30 includes a lens (not shown).

The support part 40 supports the support frame 20 and the fixing base 13 in such a manner that the support frame 20 can freely move relative to the fixing base 13 in a direction orthogonal to an optical axis of the lens.

The support part 40 may be a ball. At least three balls 40 can be provided, and correspondingly a ball receiving surface 41, on which the balls 40 are to be placed, is arranged at an upper portion of the support frame 20. Rolling of the balls 40 enables the support frame 20 to freely move relative to the fixing base 13 in the direction orthogonal to the optical axis of the lens.

In an embodiment, the ball 40 can directly abut against the cover 12, i.e., the ball receiving surface for the ball 40 can be a part of the cover 12. For example, the cover 12 can include a bottom portion being the ball receiving surface for the ball 40. In this way, there is no need for other components abutting against the ball, so that assembly efficiency and assembly stability can be improved.

Further, in another preferred embodiment, providing the connection line fixing base 11 with a second driving coil auxiliary part can improve an efficiency of an electromagnetic interaction.

The spring leaf 50 connects the lens module 30 with the support frame 20.

The spring leaf 50 includes an upper spring leaf 51 and a lower spring leaf 52 that are respectively arranged on an upper surface portion and a lower surface portion of the lens module 30 along the optical axis direction of the lens.

The magnet steel 60 is mounted and fixed to the support frame 20.

The lens driving device 100 is provided with a magnet yoke 90, and the magnet yoke 190 is mounted and fixed to the fixing base 13, and has functions of pulling the magnet steel 60 towards the optical axis direction and pulling the lens module towards a center of the optical axis when the lens module moves in a direction perpendicular to the optical axis direction.

The first driving coil 70 is mounted and fixed to the lens module 30 and is opposite to the magnet steel 60.

The lens module 30 is provided with a protrusion 31 extending in a direction facing away from a center of the lens module. The first driving coil 70 is held at the protrusion 31. The first driving coil 70 is opposite to the magnet steel 60. Under an electromagnetic interaction between the first driving coil 70 and the magnet steel 60, the lens module can move along the optical axis direction of the lens, thereby achieving focusing.

The second driving coil 71 is arranged at the fixing base 13 and is arranged correspondingly to an upper portion of the magnet steel 60.

The second driving coil 71 can be a coil winding that is mounted and fixed on the fixing base 13, or can be a conductive pattern directly formed on the fixing base 13. Under an electromagnetic interaction between the second driving coil 71 and the magnet steel 60, the support frame 20 can move relative to the fixing base 13 in the direction orthogonal to the optical axis of the lens, thereby achieving adjustment relating to movement of the optical axis of the lens.

In an embodiment, four first driving coils 70 can be provided. It should be noted that providing four first driving coils 70 is merely an embodiment for allowing those skilled in the art to completely understand the present disclosure, and the present disclosure is not limited to the embodiment in which the number of the first driving coils 70 is four.

Corresponding to the four first driving coils 70, upper spring leaves 51 are arranged together with the four first driving coils 70 to be centrosymmetric with respect to the optical axis of the lens, i.e., being arranged at positions symmetrical with respect to a center line.

The lens driving device 100 is further provided with a connection line 80.

The connection line 80 is connected to the spring leaf 50. Each first driving coil 70 includes an end having a line end connected to a corresponding upper spring leaf 51, and another end having a line end connected to the lower spring leaf 52. Alternatively, a magnetism detecting element 81 including a first driving circuit can be connected to the line end of each first driving coil, and then the magnetism detecting element 81 including the first driving circuit is connected to the spring leaf 50 and to the connection line 80.

The magnetism detecting element 81 including the first driving circuit is an example, and it can also be a driving IC capable of magnetism detection. The magnetism detecting element 81 including the first driving circuit detects magnetism of the magnet steel 60 corresponding to the magnetism detecting element, thereby detecting a position of the lens module 30 moving in the optical axis direction. This can achieve more efficient adjustment relating to the movement of the lens in the optical axis direction.

Similarly, corresponding to the first driving coils 70, four magnet steels 60 and four second driving coils 71 are provided, and the four magnet steels 60 and the four second driving coils 71 are respectively arranged to be centrosymmetric with respect to the optical axis of the lens, i.e., being respectively arranged at positions symmetrical with respect to the center line.

The second driving coil 71 and a second driving coil auxiliary part 73 are electrically connected to a connection terminal 15, and the connection terminal 15 is provided at the connection line fixing base and connected to an external component. However, the second driving coil 71 and the second driving coil auxiliary part 73 can also be connected to the magnetism detecting element 82 including a second driving circuit. Here, the magnetism detecting element 82 including the second driving circuit is merely an example, and it can also be a driving IC capable of magnetism detection. The magnetism detecting element 82 including the second driving circuit is located at a position corresponding to the magnet steel 60, and can detect a position of the magnet steel 60 moving together with the support frame 20.

When the optical axis of the lens moves or tends to move due to shake, a current can flow into four second driving coils 71 provided nearby a horizontal position of a center 32 of gravity of the lens module or into the second driving coil 71 and the second driving coil auxiliary part 72. Since the second driving coil 71 and the second driving coil auxiliary part 73 are fixed, according to the law of action and reaction, the support frame 20 can on the one hand efficiently keep balance relative to a center of gravity of a moving object and on the other hand move relative to the fixing base 13 along the direction orthogonal to the optical axis of the lens, or can suppress the moving tendency of the optical axis of the lens. Therefore, movement of the optical axis of the lens can be adjusted.

Figure 5:
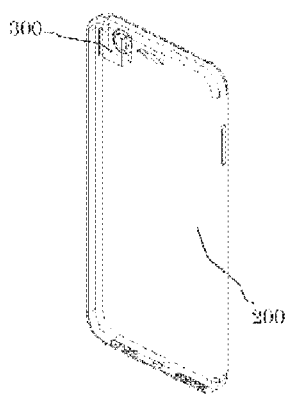
FIG. 5 shows a portable electronic device (portable information terminal) including a lens driving device according to the present disclosure.

The above-mentioned lens driving device 100 can also be used in a photographic device 300 for use in portable information device 200 such as a so-called smart cellphone, a so-called function cellphone or a tablet device shown in FIG. 5.

With the lens driving device 100 of the present disclosure, movement of the optical axis of the lens can be adjusted, so that a purpose of anti-shake can be achieved, thereby improving a quality of the captured image.

The above-described embodiments are merely preferred embodiments of the present disclosure and are not intended to limit the scope of the present disclosure. Any equivalent modification or variation made by those skilled in the art based on the present disclosure is included in the scope of the present disclosure.

REFERENCE SIGNS

10 . . . case
11 . . . connection line fixing base
12 . . . cover
13 . . . fixing base
14 . . . receiving space
15 . . . connection terminal provided at connection line fixing base and connected to external component
20 . . . support frame
30 . . . lens module
31 . . . protrusion
32 . . . center of gravity of lens module
40 . . . support part
41 . . . ball receiving surface
42 . . . cylindrical holding part
50 . . . spring leaf
51 . . . upper spring leaf
52 . . . lower spring leaf
60 . . . magnet steel
61 . . . magnet steel corresponding to magnet detecting element
62 . . . second portion of magnet steel
70 . . . first driving coil
71 . . . second driving coil
73 . . . second driving coil auxiliary part
80 . . . connection line
81 . . . magnetism detecting element including first driving circuit
82 . . . magnetism detecting element including second driving circuit
90 . . . magnet yoke
100 . . . lens driving device
200 . . . portable information device
300 . . . photographic device

What is claimed is:

1. A lens driving device, comprising:
a case comprising a fixing base having a receiving space and a cover, the cover defining the receiving space together with the fixing base;
a lens module comprising a lens barrel for receiving a lens;
a support frame internally provided with the lens module;

a spring leaf connecting the lens module with the support frame;

a support part connecting the support frame with the fixing base in such a manner that the support frame is freely movable relative to the fixing base in a direction orthogonal to an optical axis of the lens;

a magnet steel mounted and fixed to the support frame;

a first driving coil mounted and fixed to the lens barrel and being opposite to the magnet steel fixed to the support frame; and a second driving coil arranged at the fixing base, corresponding to an upper portion of the magnet steel and close to a horizontal position of a center of gravity of the lens module, wherein under an electromagnetic interaction between the first driving coil and the magnet steel, the lens barrel moves along an optical axis direction of the lens, and under an electromagnetic interaction between the second driving coil and a second portion of the magnet steel opposite to the second driving coil, the support frame moves relative to the fixing base in the direction orthogonal to the optical axis of the lens.

2. The lens driving device as described in claim 1, wherein the support part comprises at least three balls, and the cover comprises a bottom portion being a ball receiving surface for the at least three balls.

3. The lens driving device as described in claim 1, wherein the support part is held at the bottom portion of the cover by a cylindrical holding member.

4. The lens driving device as described in claim 2, wherein the support part is held at the bottom portion of the cover by a cylindrical holding member.

5. The lens driving device as described in claim 3, wherein the cylindrical holding member is held by the fixing base.

6. The lens driving device as described in claim 4, wherein the cylindrical holding member is held by the fixing base.

7. The lens driving device as described in claim 1, wherein the spring leaf has a path for energization of a magnetic detecting element of the lens barrel moving in the optical axis direction of the lens.

8. The lens driving device as described in claim 2, wherein the spring leaf has a path for energization of a magnetic detecting element of the lens barrel moving in the optical axis direction of the lens.

9. The lens driving device as described in claim 1, wherein the magnet steel is clamped by the second driving coil being opposite to and disposed above the second portion of the magnet steel, so as to generate an electromagnetic interaction.

10. The lens driving device as described in claim 2, wherein the magnet steel is clamped by the second driving coil being opposite to and disposed above the second portion of the magnet steel, so as to generate an electromagnetic interaction.

11. The lens driving device as described in claim 1, wherein the spring leaf has a path for energization of a blade driving device combined on an upper surface of the lens barrel.

12. The lens driving device as described in claim 2, wherein the spring leaf has a path for energization of a blade driving device combined on an upper surface of the lens barrel.

13. A camera, comprising a lens driving device, the lens driving device comprising:

a case comprising a fixing base having a receiving space and a cover, the cover defining the receiving space together with the fixing base;

a lens module comprising a lens barrel for receiving a lens;

a support frame internally provided with the lens module;

a spring leaf connecting the lens module with support frame;

a support part connecting the support frame with the fixing base in such a manner that the support frame is freely movable relative to the fixing base in a direction orthogonal to an optical axis of the lens;

a magnet steel mounted and fixed to the support frame;

a first driving coil mounted and fixed to the lens barrel and being opposite to the magnet steel fixed to the support frame; and a second driving coil arranged at the fixing base, corresponding to an upper portion of the magnet steel and close to a horizontal position of a center of gravity of the lens module, wherein under an electromagnetic interaction between the first driving coil and the magnet steel, the lens barrel moves along an optical axis direction of the lens, and under an electromagnetic interaction between the second driving coil and a second portion of the magnet steel opposite to the second driving coil, the support frame moves relative to the fixing base in the direction orthogonal to the optical axis of the lens.

14. A portable electronic device, comprising a camera comprising a lens driving device, the lens driving device comprising:

a case comprising a fixing base having a receiving space and a cover, the cover defining the receiving space together with the fixing base;

a lens module comprising a lens barrel for receiving a lens;

a support frame internally provided with the lens module;

a spring leaf connecting the lens module with support frame;

a support part connecting the support frame with the fixing base in such a manner that the support frame is freely movable relative to the fixing base in a direction orthogonal to an optical axis of the lens;

a magnet steel mounted and fixed to the support frame;

a first driving coil mounted and fixed to the lens barrel and being opposite to the magnet steel fixed to the support frame; and a second driving coil arranged at the fixing base, corresponding to an upper portion of the magnet steel and close to a horizontal position of a center of gravity of the lens module, wherein under an electromagnetic interaction between the first driving coil and the magnet steel, the lens barrel moves along an optical axis direction of the lens, and under an electromagnetic interaction between the second driving coil and a second portion of the magnet steel opposite to the second driving coil, the support frame moves relative to the fixing base in the direction orthogonal to the optical axis of the lens.

\* \* \* \* \*